United States Patent
Chang

(10) Patent No.: US 11,994,221 B2
(45) Date of Patent: May 28, 2024

(54) WATER CONTROL VALVE

(71) Applicant: Chia-Po Chang, Changhua (TW)

(72) Inventor: Chia-Po Chang, Changhua (TW)

( * ) Notice: Subject to any disclaimer, the term of this patent is extended or adjusted under 35 U.S.C. 154(b) by 415 days.

(21) Appl. No.: 17/335,977

(22) Filed: Jun. 1, 2021

(65) Prior Publication Data

US 2022/0381352 A1 Dec. 1, 2022

(51) Int. Cl.
*F16K 11/074* (2006.01)
*E03C 1/04* (2006.01)

(52) U.S. Cl.
CPC .......... *F16K 11/0743* (2013.01); *E03C 1/041* (2013.01)

(58) Field of Classification Search
CPC .......................... F16K 11/0743; F16K 27/044
See application file for complete search history.

(56) References Cited

U.S. PATENT DOCUMENTS

| | | | |
|---|---|---|---|
| 10,167,963 B1 * | 1/2019 | Chang | F16K 11/072 |
| 10,167,964 B1 * | 1/2019 | Chang | F16K 31/002 |
| 10,570,591 B2 * | 2/2020 | Chang | F16K 17/38 |
| 10,648,162 B2 * | 5/2020 | Chang | F16K 31/002 |

FOREIGN PATENT DOCUMENTS

| | | |
|---|---|---|
| TW | I638956 A1 | 10/2018 |
| TW | I638957 A1 | 10/2018 |
| TW | I640706 A1 | 11/2018 |
| TW | I640709 A1 | 11/2018 |

* cited by examiner

*Primary Examiner* — Reinaldo Sanchez-Medina
(74) *Attorney, Agent, or Firm* — Ying-Ting Chen; Law Office of Michael Chen

(57) ABSTRACT

A water control valve may include a valve shell, a valve base, a shunt valve, and a temperature control unit. The valve shell has a control base, a driving valve piece, and a fixed valve piece, and a valve stem upwardly protrudes from a center of the control base out of the valve shell. The valve base comprises an upper base and a lower base, which are configured to fit together, and the upper base has an inner space to accommodate and install the temperature control unit therein. The temperature control unit has a cap, a supporting sleeve, a temperature sensor, a sealing sleeve, and a spring.

9 Claims, 10 Drawing Sheets

A-A

B-B

WATER CONTROL VALVE

FIELD OF THE INVENTION

The present invention relates to a water control valve and more particularly to a ceramic water control valve having the advantages of stable temperature control and universal installation.

BACKGROUND OF THE INVENTION

Since the conditional water control valve has no functions of temperature sensing and temperature limiting, it is easy that the user is scalded accidentally while using water. As the inventor's previous application of water control valve provided constant temperature water disclosed in Taiwan Patents (Certificates No. I638956, No. I638957, No. I640706, and No. I640709), the water control valve may include a temperature sensor which can be expanded by heat and returned to its original state upon cooling. Also, the temperature sensor can be installed in different valve bodies such as the rotary type water control valve, the pop-up type water control valve, the rotary type balanced valve, and the pop-up type balanced valve.

However, the above-mentioned conventional water control valve has following disadvantages: (i) the shunt valve of the water control valve installed between the upper base and the lower base cannot be fully connected to the upper base, so that the water channels between the upper base and the shunt valve is not positioned stably, thereby causing unstable temperature of water outlet due to large pressure drop in the shunt valve; and (ii) one type of the upper base cannot be generally used in different valves, so that the upper base shall be made according to different valve bodies, thereby increasing the manufacturing cost. Therefore, there remains a need for a new and improved design for a water control valve to overcome the problems presented above.

SUMMARY OF THE INVENTION

The present invention provides a water control valve comprising a valve shell, a valve base, a shunt valve, and a temperature control unit. The valve shell has a control base, a driving valve piece, and a fixed valve piece, and a valve stem upwardly protrudes from a center of the control base out of the valve shell. The valve base comprises an upper base and a lower base, which are configured to fit together, and the upper base has an inner space to accommodate and install the temperature control unit therein. The temperature control unit has a cap, a supporting sleeve, a temperature sensor, a sealing sleeve, and a spring. A cold water hole, a hot water hole, a first cold water through hole, a first hot water through hole, and a first temperature control hole respectively penetrate through a top surface of the upper base, and a lower surface of the upper base has a first housing and a second housing at the positions corresponding to the cold water hole and the hot water hole, and the first hot water through hole. A cold water inlet hole, a hot water inlet hole, at least a cold water outlet hole, and a mixing water outlet respectively penetrate through the lower base, and the cold water inlet hole and the hot water inlet hole are respectively connected to the cold water source and the hot water source. A protruding portion protrudes from a top surface of the lower base, and the cold water inlet hole and the hot water inlet hole are adapted to penetrate through the protruding portion and downwardly penetrate through the lower base. The shunt valve comprises a through portion having the shape same as the first housing, and the protruding portion, and a temperature control housing formed in the shunt valve is configured to install the temperature control unit therein. When the temperature control unit is installed in the temperature control housing, the first housing and the second housing are respectively aligned with the through portion and the temperature control unit, and the upper base is coupled and firmly connected on a top surface of the shunt valve through joining technique, so as to build firm water channels in the temperature control housing and the second housing. The through portion is aligned with the first housing, so that the protruding portion is configured to pass through the through portion into the first housing. The shunt valve and the upper base, which are connected together, are adapted to be coupled on the top surface of the lower base, and the supporting sleeve located on the lower portion of the temperature control unit is secured in the mixing water outlet of the lower base. The shunt valve has a second cold water through hole which are communicated with the first cold water through hole and the cold water outlet hole, and a second temperature control hole concavely formed on a top surface of the shunt valve is aligned with the first temperature control hole of the upper base. At least a third cold water through hole is connected between one end of the second temperature control hole and the lateral side of the temperature control housing so as to communicate the second temperature control hole with the temperature control housing. The user is configured to only switch the positions of the second cold water through hole and the second temperature control hole, without changing the configuration of the internal passageways of the upper base and the lower base, to apply the valve base to different valve bodies.

Comparing with conventional water control valve, the present invention is advantageous because: (i) the shunt valve and the upper base are connected through the joining technique to build firm water channels in the temperature control housing and the second housing, so as to prevent the large pressure drop in the shunt valve; and (ii) the configuration of the shunt valve enables the valve base to be applied to different valve body, which improves the practicability of the water control valve and reduces the manufacturing costs.

DETAILED DESCRIPTION OF THE INVENTION

Figure 1:
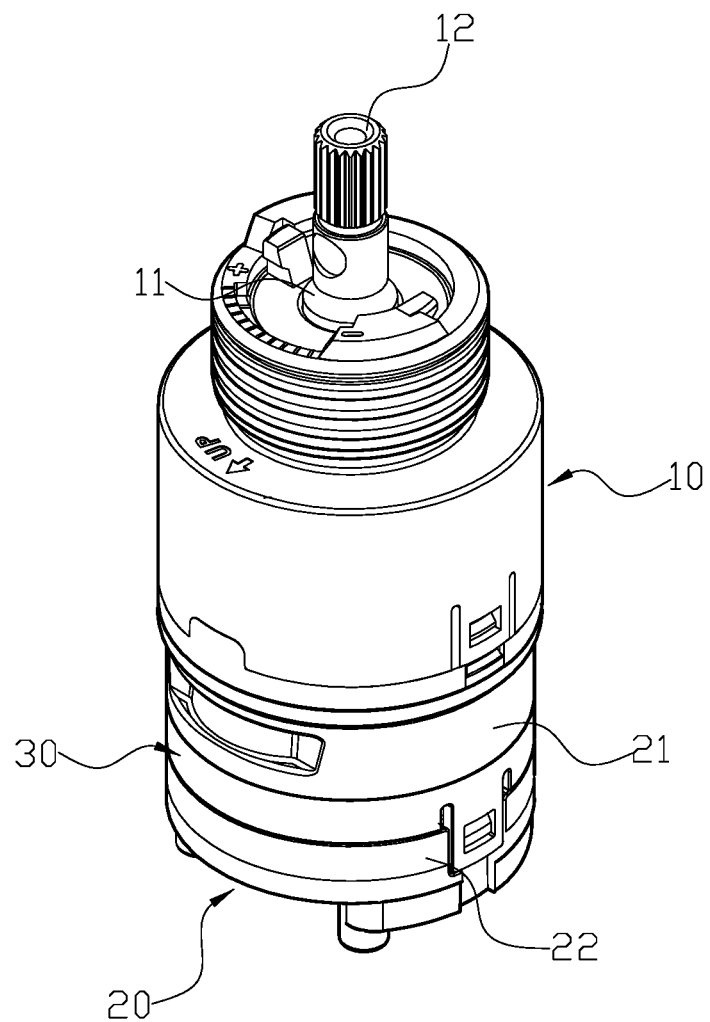
FIG. 1 is a three-dimensional assembly view of a first embodiment of a water control valve of the present invention.
Figure 2:
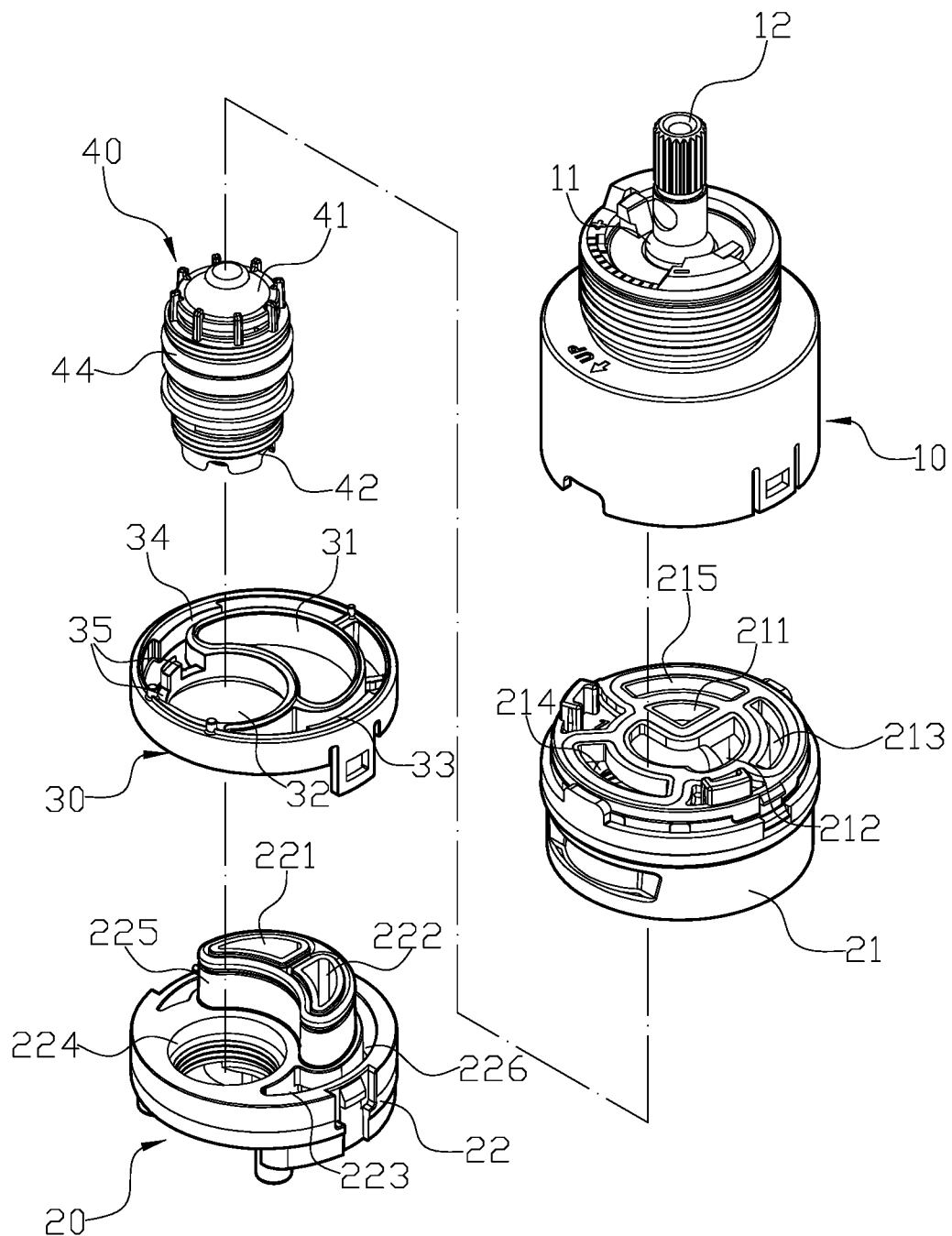
FIG. 2 is a three-dimensional explored view of the first embodiment of the water control valve of the present invention.
Figure 3:
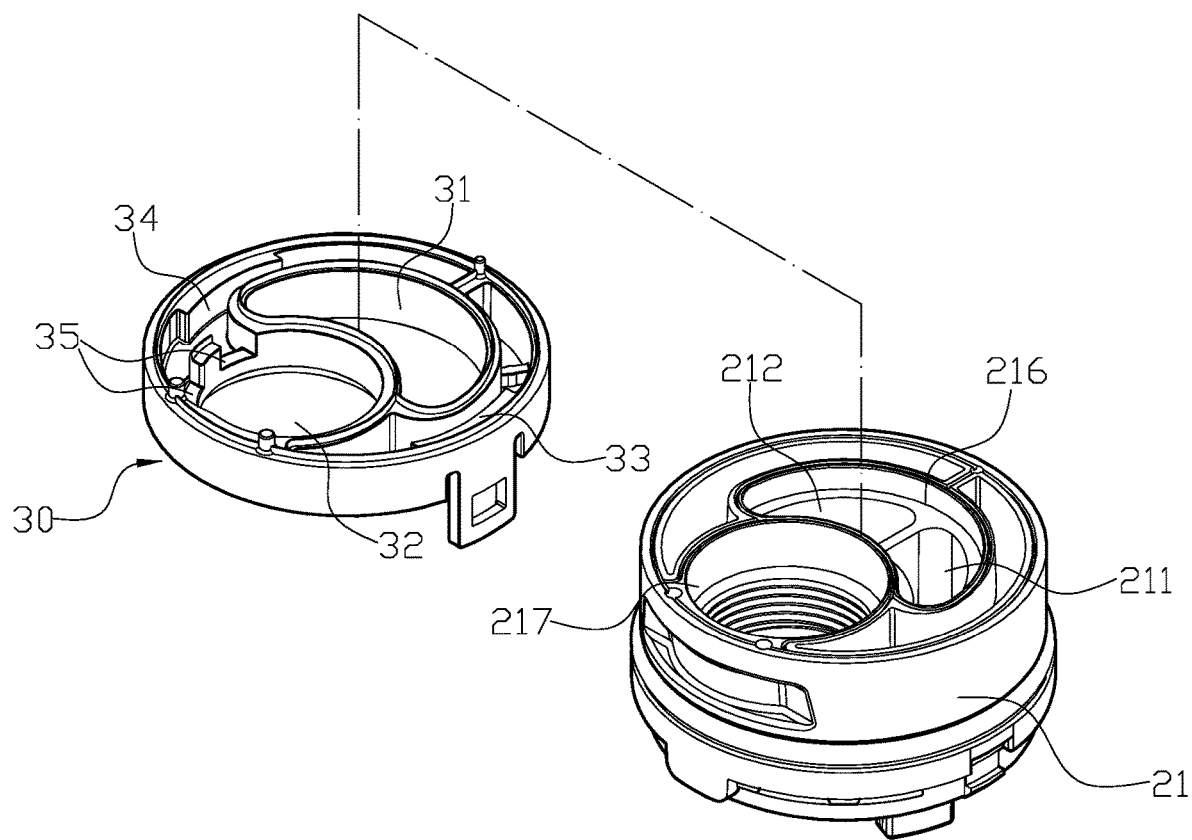
FIG. 3 is a three-dimensional of the first embodiment illustrating an upper base of the water control valve of the present invention from another angle.
Figure 4:
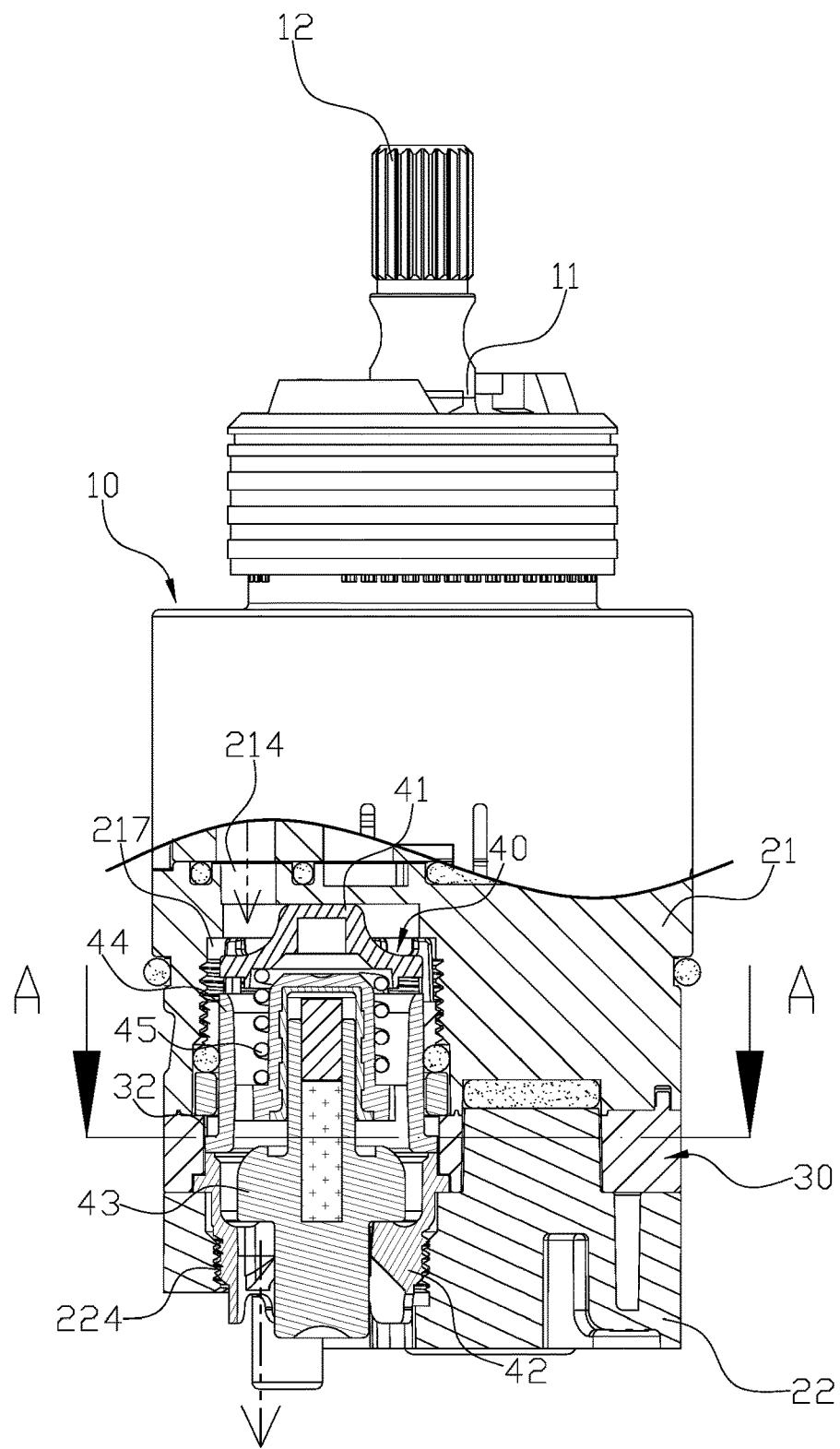
FIG. 4 is a sectional assembly view of the first embodiment of the water control valve of the present invention.

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

In order to further understand the goal, characteristics and effect of the present invention, a number of embodiments along with the drawings are illustrated as following:

Referring to FIGS. 1 to 4, the present invention provides a water control valve comprising a valve shell (10), a valve base (20), a shunt valve (30), and a temperature control unit (40). The valve shell (10) has a control base (11), a driving valve piece (not shown in FIGs.), and a fixed valve piece (not shown in FIGs.), and a valve stem (12) upwardly protrudes from a center of the control base (11) out of the valve shell (10). The valve base (20) comprises an upper base (21) and a lower base (22), which are configured to fit together, and the upper base (21) has an inner space to accommodate and install the temperature control unit (40) therein. The temperature control unit (40) has a cap (41), a supporting sleeve (42), a temperature sensor (43), a sealing sleeve (44), and a spring (45) [since the present application is based on the Taiwan Patents (Certificates No. I638956, No. I638957, No. I640706, No. I640709 disclosed in IDS), the above-mentioned components, including the driving valve piece, the fixed valve piece, the cap (41), the supporting sleeve (42), the temperature sensor (43), the sealing sleeve (44), and the spring (45), have the same structures and well described in the Taiwan Patents, and thus the details of these components will not be described here]. A cold water hole (211), a hot water hole (212), a first cold water through hole (213), a first hot water through hole (214), and a first temperature control hole (215) respectively penetrate through a top surface of the upper base (21), and a lower surface of the upper base (21) has a first housing (216) and a second housing (217) at the positions corresponding to the cold water hole (211) and the hot water hole (212), and the first hot water through hole (214). A cold water inlet hole (221), a hot water inlet hole (222), at least a cold water outlet hole (223), and a mixing water outlet (224) respectively penetrate through the lower base (22), and the cold water inlet hole (221) and the hot water inlet hole (222) are respectively connected to the cold water source and the hot water source. A protruding portion (225) protrudes from a top surface of the lower base (22), and the cold water inlet hole (221) and the hot water inlet hole (222) are adapted to penetrate through the protruding portion (225) and downwardly penetrate through the lower base (22). The shunt valve (30) comprises a through portion (31) having the shape same as the first housing (216), and the protruding portion (225), and a temperature control housing (32) formed in the shunt valve (30) is configured to install the temperature control unit (40) therein. When the temperature control unit (40) is installed in the temperature control housing (32), the first housing (216) and the second housing (217) are respectively aligned with the through portion (31) and the temperature control unit (40), and the upper base (21) is coupled and firmly connected on a top surface of the shunt valve (30) through joining technique, so as to build firm water channels in the temperature control housing (32) and the second housing (217). Also, the through portion (31) is aligned with the first housing (216), so that the protruding portion (225) is configured to pass through the through portion (31) into the first housing (216). The shunt valve (30) and the upper base (21), which are connected together, are adapted to be coupled on the top surface of the lower base (22), and the supporting sleeve (42) located on the lower portion of the temperature control unit is secured in the mixing water outlet (224) of the lower base (22). Moreover, the shunt valve (30) has a second cold water through hole (33) which are communicated with the first cold water through hole (213) and the cold water outlet hole (223), and a second temperature control hole (34) concavely formed on a top surface of the shunt valve (30) is aligned with the first temperature control hole (215) of the upper base (21). Furthermore, at least a third cold water through hole (35) is connected between one end of the second temperature control hole (34) and the lateral side of the temperature control housing (32) so as to communicate the second temperature control hole (34) with the temperature control housing (32). Thus, with above-mentioned structure, the user can only switch the positions of the second cold water through hole (33) and the second temperature control hole (35), without changing the configuration of the internal passageways of the upper base (21) and the lower base (22), to apply the valve base (20) to different valve bodies.

In one embodiment, referring to FIGS. 1 to 5, the valve body is a rotary type water control valve comprising a rotatable valve stem (12).

Figure 6:
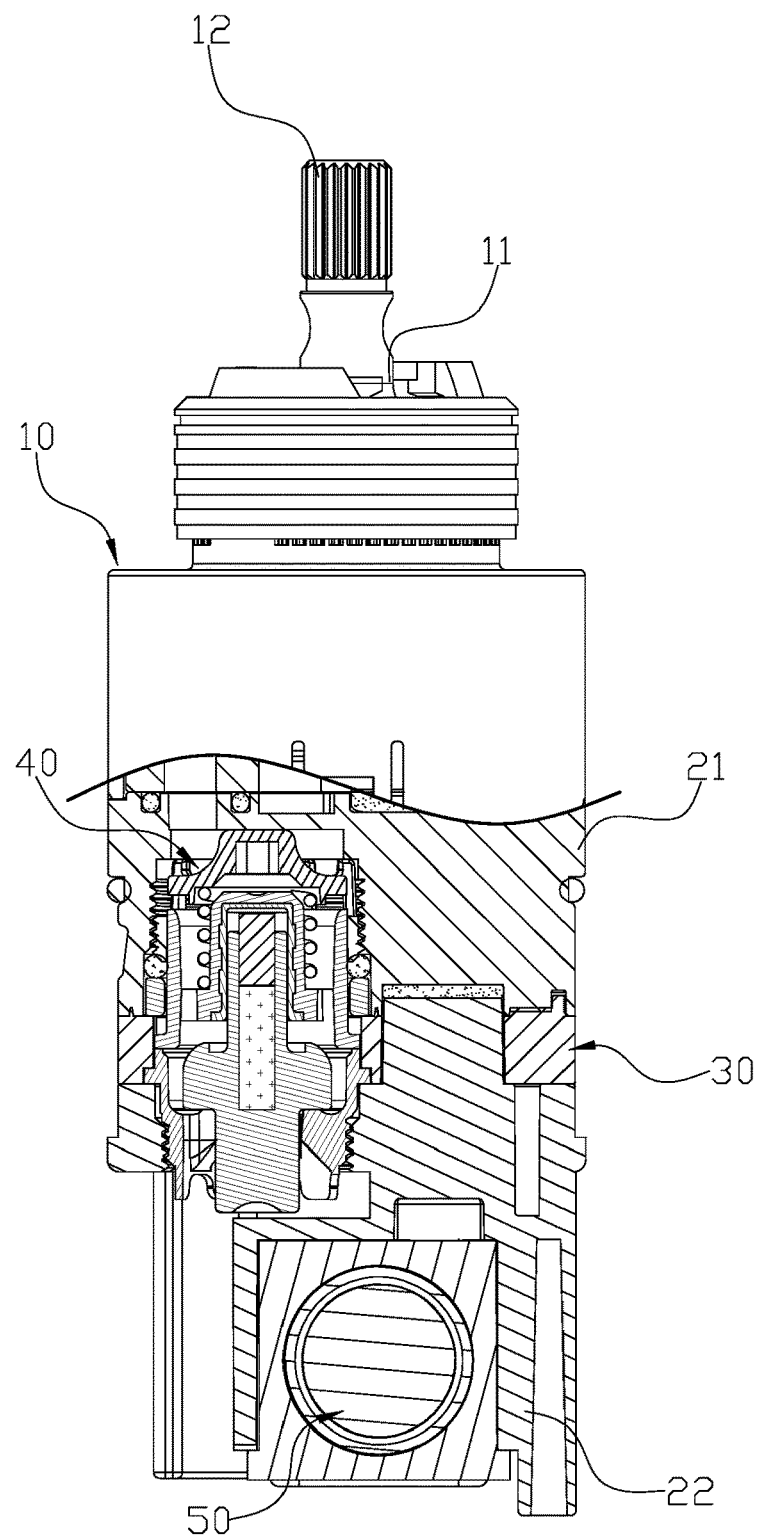
FIG. 6 is a sectional view of a second embodiment of the water control valve of the present invention.

In another embodiment, referring to FIG. 6, the valve body is a rotary type balanced valve comprising a rotatable valve stem (12), and a balanced valve (50) is installed in the lower base (22).

Figure 7:
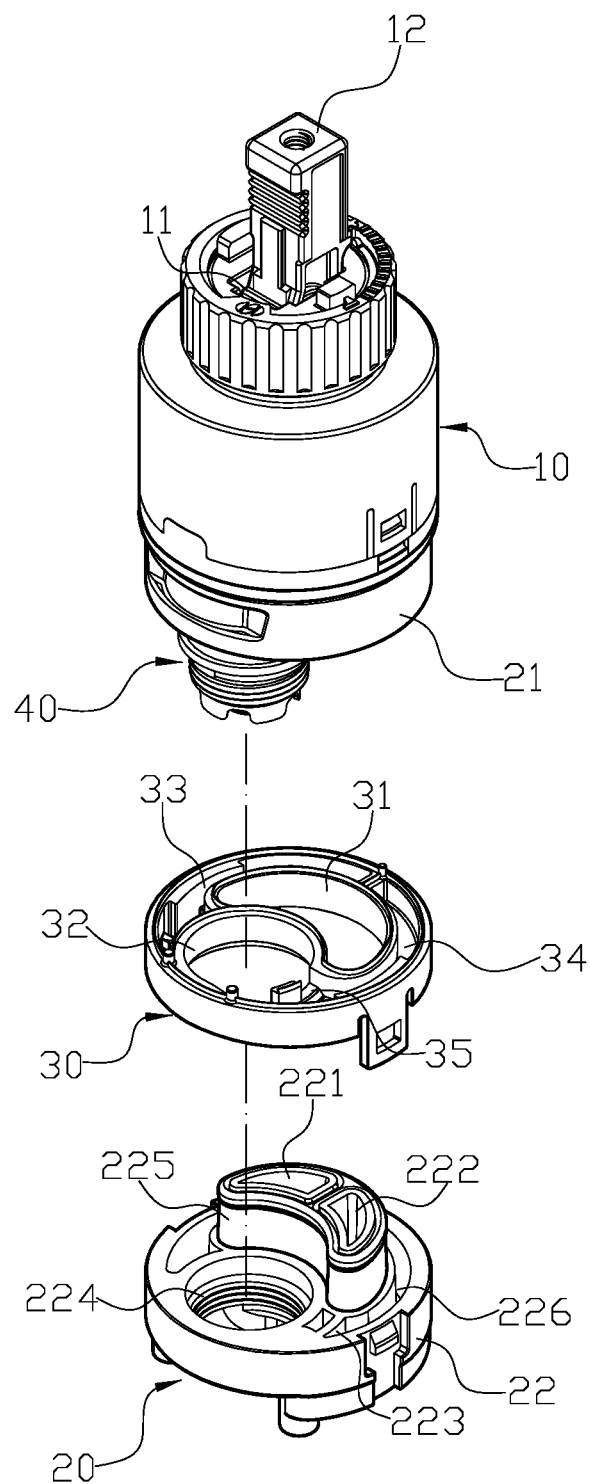
FIG. 7 is a three-dimensional explored view of a third embodiment of the water control valve of the present invention.
Figure 8:
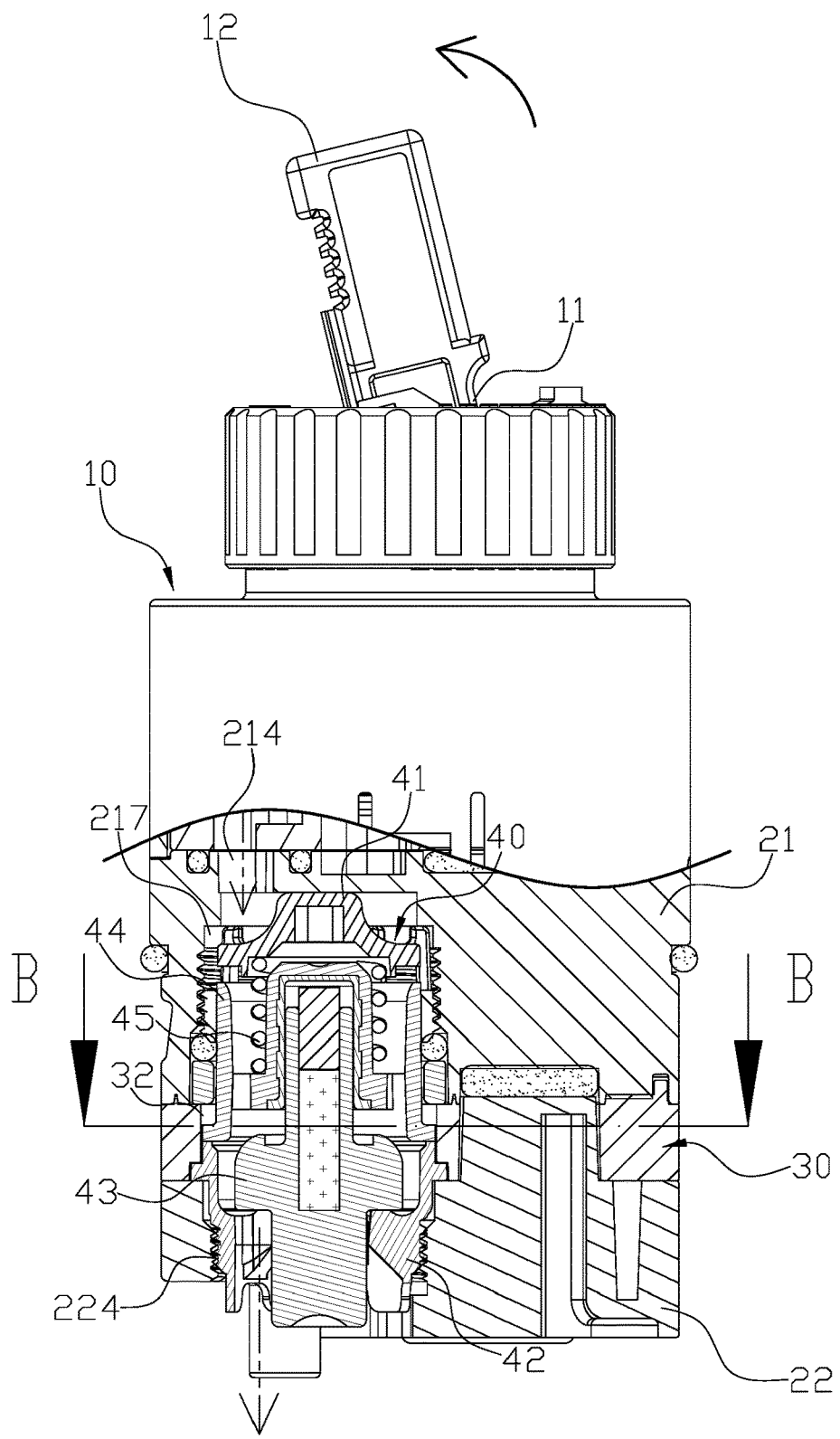
FIG. 8 is a sectional assembly view of the third embodiment of the water control valve of the present invention.
Figure 9:
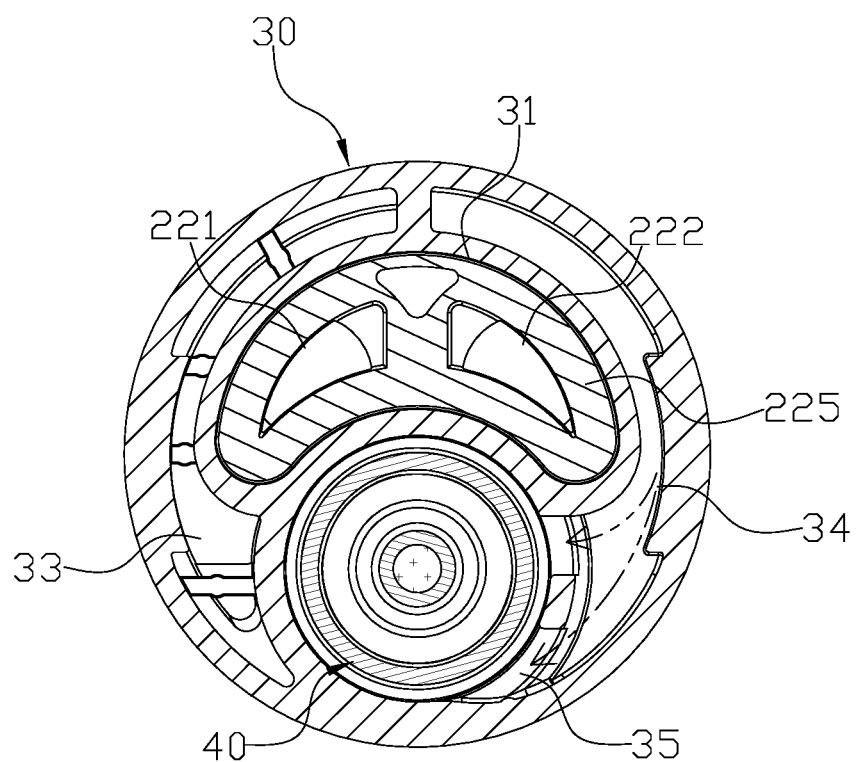
FIG. 9 is a schematic view illustrating cold water flows into the temperature control unit of the water control valve of the present invention.

In still another embodiment, referring to FIGS. 7 to 9, the valve body is a pop-up type water control valve comprising a pullable valve stem (12).

Figure 10:
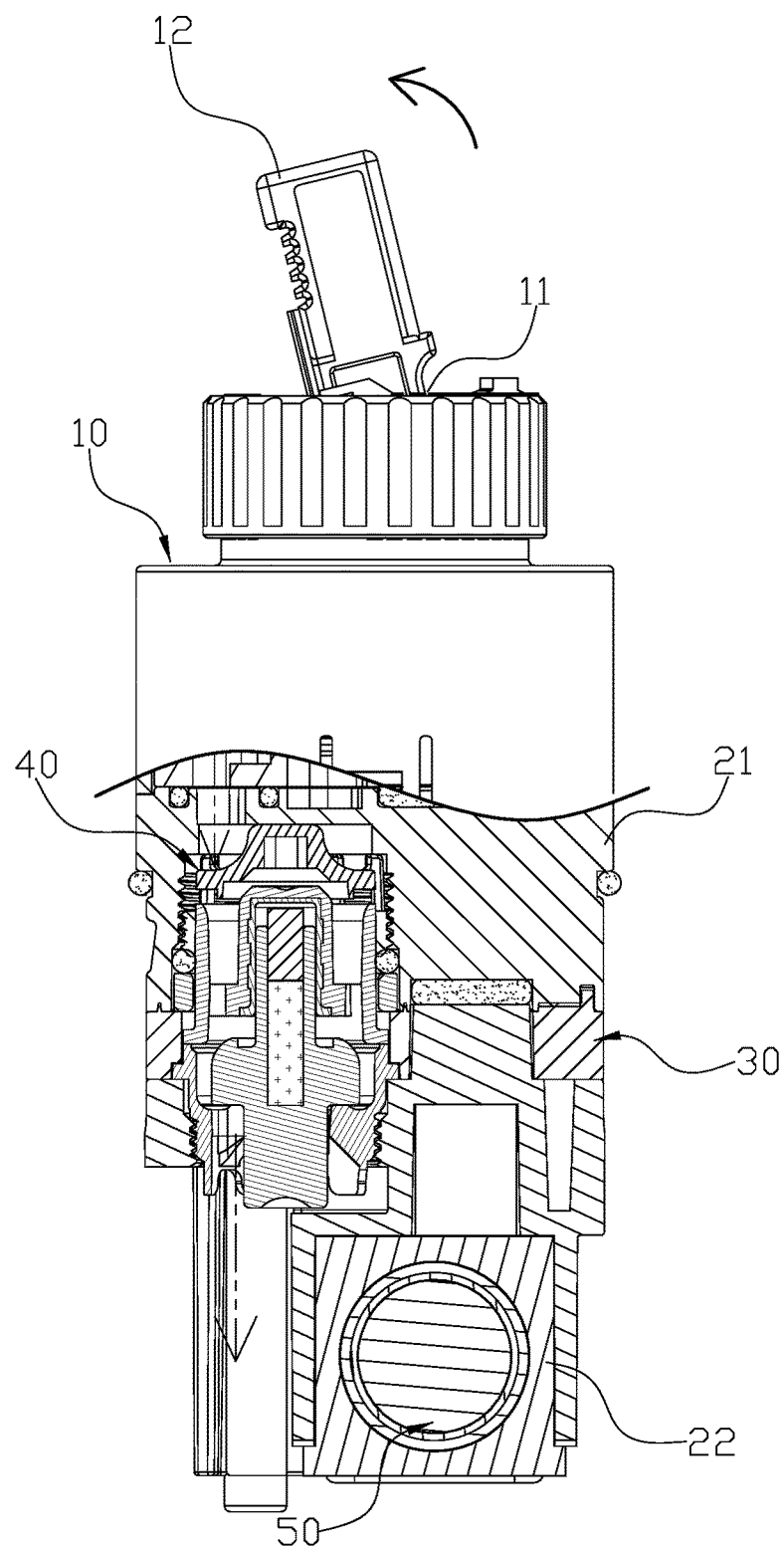
FIG. 10 is a sectional view of a fourth embodiment of the water control valve of the present invention.

In a further embodiment, referring to FIG. 10, the valve body is a pop-up type balanced valve having a pullable valve stem (12), and the balanced valve (50) is installed in the lower base (22).

In still a further embodiment, the upper base (21) and the shunt valve (30) are firmly connected through high frequency joining technique.

In a preferred embodiment, the upper base (21) and the shunt valve (30) are firmly connected through ultrasonic joining technique.

In another preferred embodiment, the upper base (21) and the shunt valve (30) are connected in the manner that the shunt valve (30) is engaged with the lower base (22) while the upper base (21) is engaged with the valve shell (10).

In an advantageous embodiment, the lower base (22) of the valve base (20) comprises a water channel (226) at the position corresponding to the second cold water through hole (33) of the shunt valve (30), and the water channel (226) has at least an end thereof penetrating through the cold water outlet hole (223).

In another advantageous embodiment, each of the protruding portion (225), the through portion (31), and the first housing (216) has the crescent-shape cross section at corresponding positions.

Figure 5:
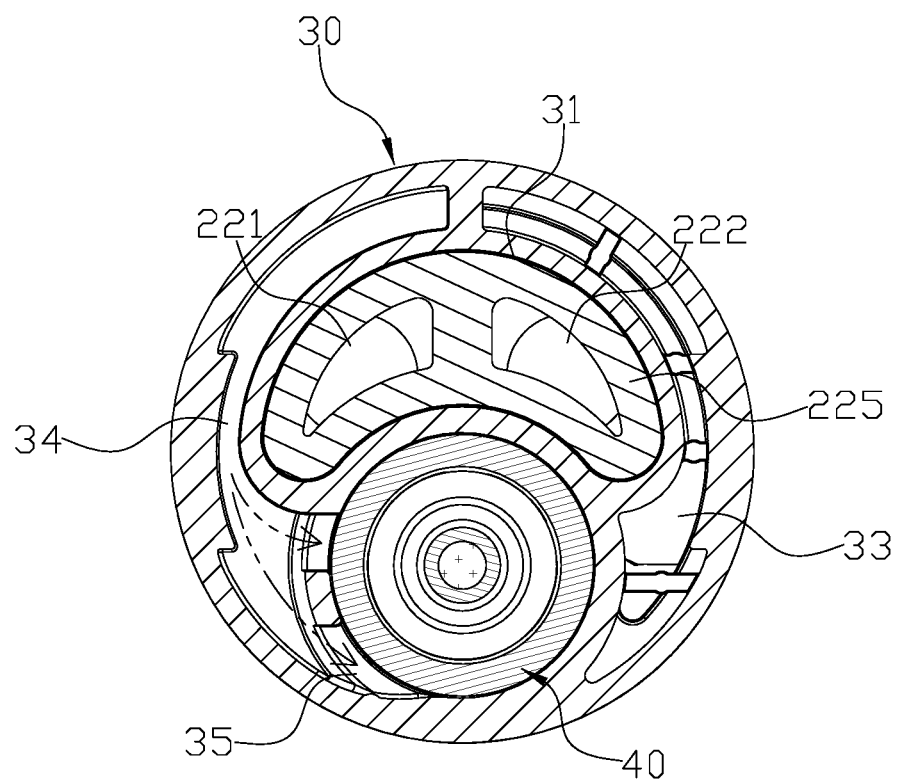
FIG. 5 is a schematic view illustrating cold water flows into a temperature control unit of the water control valve of the present invention.

The valve stem (12) is connected to an external handle, and when the warm water is needed, the user can operate the handle to drive and shift the driving valve piece, and hot water is adapted to flow through the first hot water through hole (214) and the second housing (217) into the temperature control unit (40), and cold water is configured to flow through the first temperature control hole (215), the second temperature control hole (34), and the third cold water through hole (35) into the temperature control unit (40) (as shown in FIG. 5 or FIG. 9). Hot water and cold water are mixed in the temperature control unit (40) into warm water, and then flow out from the mixing water outlet (224). In case that the operating range of the handle is too large or the water pipe is lack of cold water for mixing, the excessively heated of the temperature sensor (43) is activated to properly or completely block hot water until the mixing water, which is too hot, cools down before flowing out, so as to prevent the user to be scalded accidentally while using water.

Comparing with conventional water control valve, the present invention is advantageous because: (i) the shunt valve (30) and the upper base (21) are connected through the joining technique to form firm water channels in the temperature control housing (32) and the second housing (217), so as to prevent the large pressure drop in the shunt valve (30); and (ii) the configuration of the shunt valve (30) enables the valve base (20) to be applied to different valve body, which improves the practicability of the water control valve and reduces the manufacturing costs.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A water control valve comprising a valve shell, a valve base, a shunt valve, and a temperature control unit;
   wherein the valve shell has a control base, a driving valve piece, and a fixed valve piece, and a valve stem upwardly protrudes from a center of the control base out of the valve shell; the valve base comprises an upper base and a lower base, which are configured to fit together, and the upper base has an inner space to accommodate and install the temperature control unit therein; the temperature control unit has a cap, a supporting sleeve, a temperature sensor, a sealing sleeve, and a spring;
   wherein a cold water hole, a hot water hole, a first cold water through hole, a first hot water through hole, and a first temperature control hole respectively penetrate through a top surface of the upper base, and a lower surface of the upper base has a first housing and a second housing at the positions corresponding to the cold water hole and the hot water hole, and the first hot water through hole; a cold water inlet hole, a hot water inlet hole, at least a cold water outlet hole, and a mixing water outlet respectively penetrate through the lower base, and the cold water inlet hole and the hot water inlet hole are respectively connected to a cold water source and a hot water source; a protruding portion protrudes from a top surface of the lower base, and the cold water inlet hole and the hot water inlet hole are adapted to penetrate through the protruding portion and downwardly penetrate through the lower base; and
   wherein the shunt valve comprises a through portion having the shape same as the first housing, and the protruding portion, and a temperature control housing formed in the shunt valve is configured to install the temperature control unit therein; when the temperature control unit is installed in the temperature control housing, the first housing and the second housing are respectively aligned with the through portion and the temperature control unit, and the upper base is coupled and firmly connected on a top surface of the shunt valve through joining technique, so as to build firm water channels in the temperature control housing and the second housing; the through portion is aligned with the first housing, so that the protruding portion is configured to pass through the through portion into the first housing; the shunt valve and the upper base, which are connected together, are adapted to be coupled on the top surface of the lower base, and the supporting sleeve located on the lower portion of the temperature control unit is secured in the mixing water outlet of the lower base; the shunt valve has a second cold water through hole which are communicated with the first cold water through hole and the cold water outlet hole, and a second temperature control hole concavely formed on a top surface of the shunt valve is aligned with the first temperature control hole of the upper base; at least a third cold water through hole is connected between one end of the second temperature control hole and the lateral side of the temperature control housing so as to communicate the second temperature control hole with the temperature control housing; and the user is configured to only switch the positions of the second cold water through hole and the second temperature control hole, without changing the configuration of the internal passageways of the upper base and the lower base, to apply the valve base to different valve bodies.

2. The water control valve of claim 1, wherein one of the different valve bodies is a rotary type water control valve comprising a rotatable valve stem.

3. The water control valve of claim 1, wherein one of the different valve bodies is a rotary type balanced valve comprising a rotatable valve stem, and a balanced valve is installed in the lower base.

4. The water control valve of claim 1, wherein one of the different valve bodies is a pop-up type water control valve comprising a pullable valve stem.

5. The water control valve of claim 1, wherein one of the different valve bodies is a pop-up type balanced valve having a pullable valve stem, and the balanced valve is installed in the lower base.

6. The water control valve of claim 1, wherein the upper base and the shunt valve are firmly connected through high frequency joining technique.

7. The water control valve of claim 1, wherein the upper base and the shunt valve are firmly connected through ultrasonic joining technique.

8. The water control valve of claim 1, wherein the upper base and the shunt valve are connected in the manner that the shunt valve is engaged with the lower base while the upper base is engaged with the valve shell.

9. The water control valve of claim 1, wherein the lower base of the valve base comprises a water channel at the position corresponding to the second cold water through hole of the shunt valve, and the water channel has at least an end thereof penetrating through the cold water outlet hole.

* * * * *